(12) United States Patent
Friedman

(10) Patent No.: US 7,767,360 B2
(45) Date of Patent: Aug. 3, 2010

(54) ELECTROCHEMICAL CELL APPARATUS

(75) Inventor: Jacob Friedman, Storrs, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 604 days.

(21) Appl. No.: 11/677,704

(22) Filed: Feb. 22, 2007

(65) Prior Publication Data

US 2008/0206623 A1  Aug. 28, 2008

(51) Int. Cl.
*H01M 4/02* (2006.01)
(52) U.S. Cl. ............... 429/523; 429/507; 429/508; 429/513; 429/460; 429/400; 204/252; 204/253; 204/254; 204/263
(58) Field of Classification Search ............ None
See application file for complete search history.

(56) References Cited

U.S. PATENT DOCUMENTS

2004/0224213 A1* 11/2004 Dristy ............ 429/37
2005/0058870 A1 3/2005 Healy et al.
2006/0068253 A1* 3/2006 Henderson et al. ......... 429/30

* cited by examiner

*Primary Examiner*—Melvin C Mayes
*Assistant Examiner*—Smita Patel
(74) *Attorney, Agent, or Firm*—Cantor Colburn LLP

(57) ABSTRACT

An electrochemical cell apparatus is disclosed. The electrochemical cell apparatus includes a membrane-electrode assembly (MEA) having a membrane with a first side and a second side opposite the first side, a first electrode in contact with the first side, and a second electrode in contact with the second side. The apparatus further includes a flow field member and a protector member having a boundary partially defined by a first surface facing toward a center of the MEA. The second electrode has a boundary partially defined by a second surface facing away from the center of the MEA. A first distance from the center of the MEA to the first surface is greater than a correspondingly oriented second distance from the center of the MEA to the second surface, thereby defining a gap between the first surface and the second surface.

4 Claims, 4 Drawing Sheets

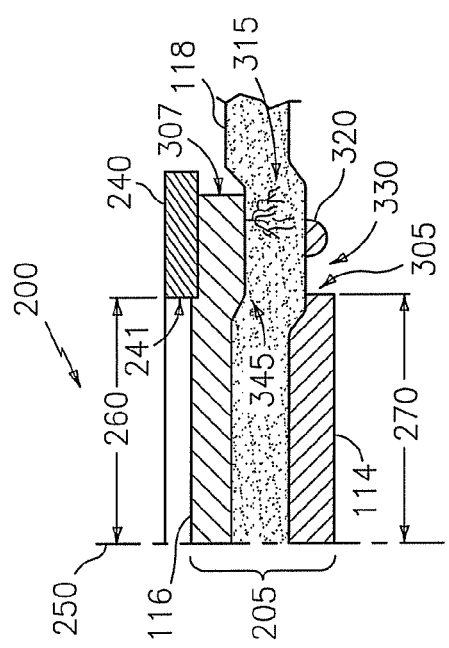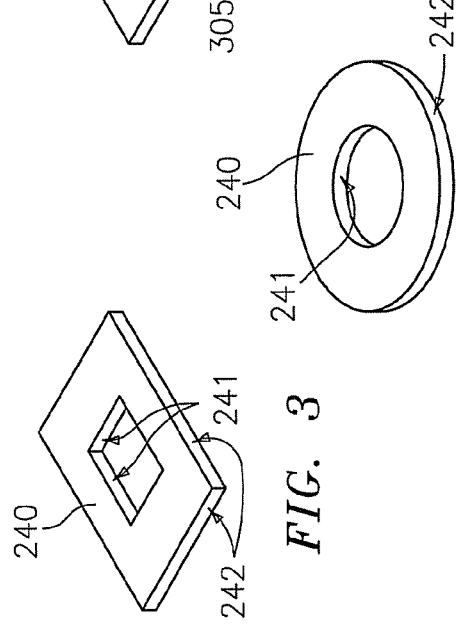

ELECTROCHEMICAL CELL APPARATUS

BACKGROUND OF THE INVENTION

The present disclosure relates generally to electrochemical cells, and particularly to electrochemical cell electrode arrangement.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exit the cell 100, while protons 106 and water 110 migrate across a proton exchange membrane 118 to cathode 114 where hydrogen gas 112 is produced.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen, from hydrogen gas, methanol, or other hydrogen source, is introduced to the hydrogen electrode (the anode in fuel cells), while oxygen, or an oxygen-containing gas such as air, is introduced to the oxygen electrode (the cathode in fuel cells). Water can also be introduced with the feed gas. Hydrogen electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode assembly", or "MEA") typically has a first flow field in fluid communication with the cathode and a second flow field in fluid communication with the anode. The MEA may furthermore be supported on both sides by screen packs or bipolar plates that are disposed within, or that alternatively define, the flow fields. Screen packs or bipolar plates may facilitate fluid movement to and from the MEA, membrane hydration, and may also provide mechanical support for the MEA.

In order to maintain intimate contact between cell components under a variety of operational conditions and over long time periods, uniform compression may be applied to the cell components. Pressure pads or other compression means are often employed to provide even compressive force from within the electrochemical cell.

Iridium can be observed deposited upon and grown dendritically into membranes 118 that utilize NAFION™ ion exchange resins in conjunction with electrodes 114, 116 that include at least one of iridium or iridium oxides. These growths are often seen originating from edges of the anode 116 growing toward the cathode 114, and are contemplated to be caused by at least one of unintended electro-activity proximate the edge of the anode 116 and "speckles" of cathode 114 material isolated from the cathode 114. These growths can lead to undesired performance of the cell by at least one of short-circuiting the cell, fusing to cause a high-heat local region, and breakdown of the membrane 118 that results in a leak of fluid between the anode 116 and the cathode 114. Previous MEA designs have attempted to reduce electro-activity proximate the edge of the anode 116 via placement of the edge of the cathode 114 inboard of the edge of the anode 116 and in line with an edge of a protector member disposed proximate the anode 116. However, dendritic growths continue to be observed in such designs. Accordingly, there is a need in the art for an electrochemical cell electrode arrangement that overcomes these drawbacks.

BRIEF DESCRIPTION OF THE INVENTION

An embodiment of the invention provides an electrochemical cell apparatus. The electrochemical cell apparatus includes a membrane-electrode assembly (MEA) having a membrane with a first side and a second side opposite the first side, a first electrode in contact with the first side, and a second electrode in contact with the second side. The apparatus further includes a flow field member disposed adjacent to the first electrode opposite the membrane, and a protector member disposed between the flow field member and the first side of the membrane, the protector member having a boundary partially defined by a first surface facing toward a center of the MEA. The second electrode has a boundary partially defined by a second surface facing away from the center of the MEA, the second surface disposed between the center of the MEA and the first surface. A first distance from the center of the MEA to the first surface is greater than a correspondingly oriented second distance from the center of the MEA to the second surface, thereby defining a gap between the first surface and the second surface and causing a current density within the first electrode to be less than a comparable current density in the absence of the gap.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures:

FIGS. 3 and 4 depict alternate embodiments of protector members in accordance with embodiments of the invention;

FIGS. 5 and 6 depict alternate embodiments of electrodes in accordance with embodiments of the invention;

FIG. 7 depicts a schematic cross-section diagram of a portion of an electrochemical cell in accordance with embodiments of the invention;

FIGS. 8, 9, and 10 depict current density modeling results corresponding to a portion of electrochemical cells in accordance with embodiments of the invention;

DETAILED DESCRIPTION OF THE INVENTION

An embodiment of the invention provides an electrochemical cell having a cathode 114 offset from an anode protector member to reduce electro-activity, such as at least one of a potential field and a current density, at edges of the anode 116 near the anode protector member to reduce dendritic growths. Another embodiment includes a thin insulative layer deposited upon a flow field member proximate the cathode to reduce unintended electrochemical activity of speckles of cathode material.

Figure 1:
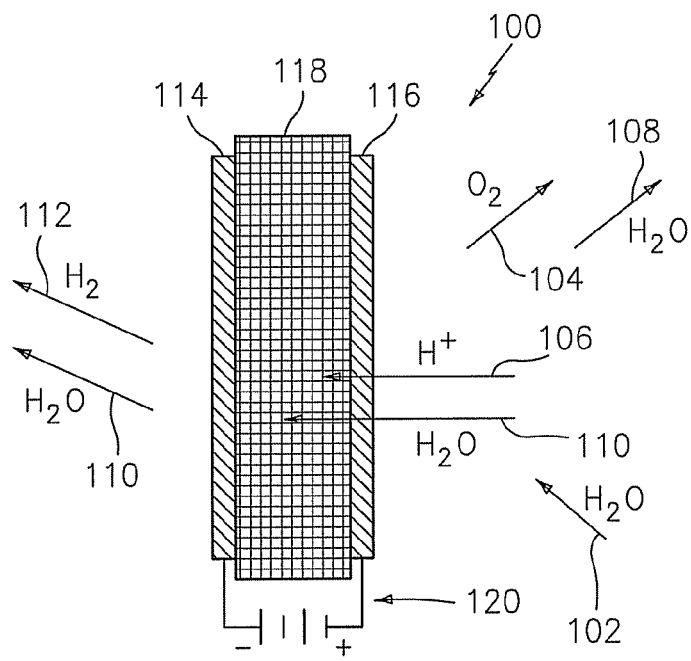
FIG. 1 depicts a schematic diagram of a partial electrochemical cell in accordance with embodiments of the invention.
Figure 2:
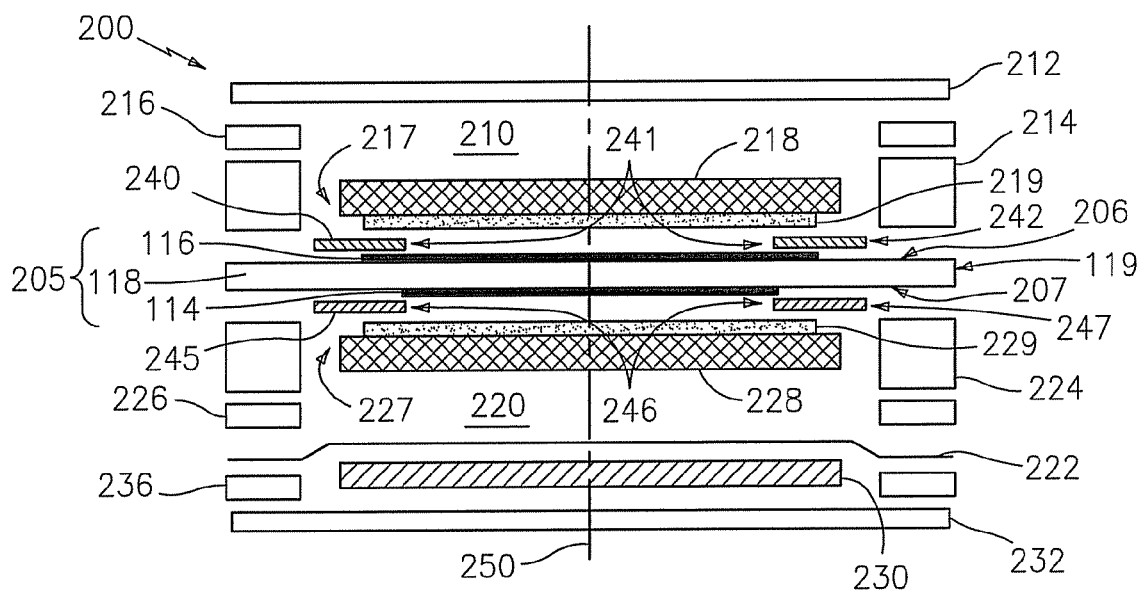
FIG. 2 depicts an exploded cross-section schematic diagram of an electrochemical cell for use in embodiments of the invention.

Referring to FIG. 2, an electrochemical cell 200 that may be suitable for operation as an anode feed electrolysis cell, cathode feed electrolysis cell, fuel cell, or regenerative fuel cell, is depicted schematically in an exploded cross section view. Thus, while the discussion below may be directed to an anode feed electrolysis cell, cathode feed electrolysis cells, fuel cells, and regenerative fuel cells are also contemplated. Cell 200 is typically one of a plurality of cells employed in a cell stack as part of an electrochemical cell system. When cell 200 is used as an electrolysis cell, voltage inputs are generally between about 1.48 volts and about 3.0 volts, at current densities between about 50 A/ft2 (amperes per square foot) and about 4,000 A/ft2. When used as a fuel cell, voltage outputs range between about 0.4 volts and about 1 volt, at current densities between about 0.1 A/ft2 and about 10,000 A/ft2. The number of cells within the stack, and the dimensions of the individual cells is scalable to the cell power output and/or gas output requirements. Accordingly, application of electrochemical cell 200 may involve a plurality of cells 200 arranged electrically either in series or parallel depending on the application. Cells 200 may be operated at a variety of pressures, such as up to or exceeding 50 psi (pounds-per-square-inch), up to or exceeding about 100 psi, up to or exceeding about 500 psi, up to or exceeding about 2500 psi, or even up to or exceeding about 10,000 psi, for example.

In an embodiment, cell 200 includes the MEA 205 having a membrane 118 with a first side 206 and a second side 207 opposite the first side 206. The MEA 205 further includes a first electrode (e.g., an anode) 116 and a second electrode (e.g., a cathode) 114 disposed on, and in contact with opposite sides 206, 207 of the membrane 118. Flow fields 210, 220, which are in fluid communication with electrodes 116 and 114, respectively, are defined generally by the regions proximate to, and bounded on at least one side by, each electrode 116 and 114 respectively.

A flow field member 217 (also herein referred to as a first flow field member), such as at least one of a screen pack 218 and a porous plate 219 may be disposed in flow field 210 adjacent to the anode 116 opposite the membrane 118. At least a portion of the flow field member 217 is in contact with the anode 116.

Another flow field member 227 (also herein referred to as a second flow field member), such as at least one of a screen pack 228 and a porous plate 229 may be disposed within flow field 220 adjacent to the cathode 114 opposite the membrane 118. At least a portion of the flow field member 227 is in contact with the cathode 114. The porous plate 219, 229 shall preferably be of conductive material, and may be included to provide additional mechanical support to the electrodes 116, 114. A frame 214 generally surrounds the flow field members 217, 227. Alternatively, at least one of the flow field members 217, 227 can include a bipolar plate, which defines the flow fields by flow channels and/or one or more layers of carbon gas diffusion material.

An optional pressure pad separator plate 222 may be disposed adjacent the flow field member 227. A pressure pad 230 is typically disposed between pressure pad separator plate 222 and a cell separator plate 232. Cell separator plate 232 is disposed adjacent to pressure pad 230. A frame 224, generally surrounding flow field 220 and an optional gasket 226, is disposed between frame 224 and pressure pad separator plate 222 generally for enhancing the seal within the reaction chamber defined on one side of cell system 200 by frame 224, pressure pad separator plate 222 and electrode 114. Gasket 236 may be disposed between pressure pad separator plate 222 and cell separator plate 232 enclosing pressure pad 230.

A cell separator plate 212 is disposed adjacent flow field member 217 opposite oxygen electrode 116, and a gasket 216 may be disposed between frame 214 and cell separator plate 212, generally for enhancing the seal within the reaction chamber defined by frame 214, cell separator plate 212 and the oxygen side of membrane 118. The cell components, particularly cell separator plates 212, 232, frames 214, 224, and gaskets 216, 226, and 236 are formed with the suitable manifolds or other conduits as is conventional.

A first protector member 240, such as an anode protector, may be disposed between the first side 206 of the membrane 118 and flow field member 217, and/or a second protector member 245, such as a cathode protector, may be disposed between the second side 207 of the membrane 118 and flow field member 227. Each protector member 240, 245 has at least one boundary that is partially defined by at least one surface 241, 246, respectively, facing toward a center 250 of the MEA 205, and at least one other boundary that is partially defined by at least one surface 242, 247 facing away from the center 250. The protector members 240, 245 prevent damage to the MEA 205 from an edge of at least one of the flow field members 217, 227. Protector members 240, 245 may be layers or rings, may be electrically conductive or non-conductive, may or may not be bonded to adjacent parts of the cell assembly, and may or may not extend to an outer edge 119 of the MEA 205.

Referring now to FIGS. 3 and 4, perspective views of alternate embodiments of an anode protector 240 are depicted, including the surfaces 241 (also herein referred to as a first surface) and the surfaces 242 that define the boundaries of the anode protector 240. For example, the rectangular anode protector 240 depicted in FIG. 3 includes the surfaces 241 that face toward the center 250 of the MEA 205 and define an inner boundary of the rectangular anode protector 240. The surfaces 242 face away from the center 250, and define an outer boundary of the rectangular anode protector 240. Similarly, the circular anode protector 240 depicted in FIG. 4 includes the surface 241 that faces toward the center 250 of the MEA 205 and defines an inner boundary of the circular anode protector 240. The surface 242 faces away from the center 250, and defines an outer boundary of the circular anode protector 240. Cathode protectors 245 having similar geometry and surfaces 246, 247 that face toward and away from, respectively, the center 250 of the MEA 205 as the anode protectors 240 depicted in FIGS. 3 and 4 are contemplated. It will be appreciated that while embodiments of the invention have been depicted having protector members with rectangular and circular shapes, the scope of the invention is not so limited, and that the invention will also apply to protector members that use other geometric shapes, such as square, pentagonal, and hexagonal, for example.

Referring now to FIGS. 5 and 6, perspective views of alternate embodiments of the cathode 114 are depicted, including surfaces 305 (also herein referred to as a second surface) that define a boundary of the cathode 114. For example, the rectangular cathode 114 depicted in FIG. 5 includes the surfaces 305 that face away from the center 250 of the MEA 205 (best seen with reference to FIG. 2) and define an outer boundary of the rectangular cathode 114. Similarly, the circular cathode 114 depicted in FIG. 6 includes the surface 305 that faces away from the center 250 of the MEA 205 and defines an outer boundary of the circular cathode 114. Anodes 116 having similar geometry and surfaces that face away from the center 250 of the MEA 205 such as the cathodes 114 depicted in FIGS. 5 and 6 are contemplated. It will be appreciated that while embodiments of the invention have been depicted having electrodes with rectangular and circular shapes, the scope of the invention is not so limited, and that the invention will also apply to protector members that use other geometric shapes, such as square, pentagonal, and hexagonal, for example.

In an embodiment, membrane 118 comprises electrolytes that are preferably solids or gels under the operating conditions of the electrochemical cell. Useful materials include proton conducting ionomers and ion exchange resins. Useful proton conducting ionomers include complexes comprising an alkali metal salt, an alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 116 and 114 may comprise a catalyst suitable for performing the needed electrochemical reaction (i.e., electrolyzing water and producing hydrogen). Suitable catalysts include, but are not limited to, materials comprising platinum, palladium, rhodium, carbon, gold, tantalum, tungsten, ruthenium, iridium, osmium, alloys thereof, and the like. Electrodes 116 and 114 may be formed on membrane 118, or may be layered adjacent to, and in contact with, membrane 118.

Screen packs 218, 228 support membrane 118, allow the passage of system fluids, and preferably are electrically conductive. The screen packs 218, 228 may include one or more layers of perforated sheets or a woven mesh formed from metal or strands, such as titanium niobium, zirconium, tantalum, titanium, carbon steel, stainless steel, nickel, cobalt, and alloys thereof, and may alternatively be arranged as perforated sheet or woven mesh, for example. Screen packs 218, 228 may include a treatment to preserve conductivity between contacting surfaces without degradation from oxidation and corrosion. An example of such a treatment is platinum plating, which is also catalytically active.

Pressure pad 230 provides even compression between cell components, is electrically conductive, and therefore generally comprises a resilient member, preferably an elastomeric material, together with a conductive material. Pressure pad 230 is capable of maintaining intimate contact to cell components at cell pressures up to or exceeding about 100 psi, preferably about 500 psi, more preferably about 2,500 psi, or even more preferably about 10,000 psi. The pressure pads can thus be introduced into a high-pressure electrochemical cell environment. The foregoing is intended for illustration, and not limitation.

Referring now to FIG. 7, a partial cross section assembly view of an embodiment of the cell 200 is depicted. The surface 241 of the anode protector 240 is facing toward, and disposed at a first distance 260 from, the center 250 of the MEA 205. The cathode 114 is disposed such that the boundary partially defined by the surface 305 (also herein referred to as a second surface) facing away from the center 250 of the MEA 205 is disposed at a second distance 270 from the center 250 of the MEA 205, correspondingly oriented to the first distance 260. As used herein, the term "correspondingly oriented", with respect to distances from the center 250 of the MEA 205, will describe distances to surfaces of different components that intersect, or are in a same section plane, such as first distance 260 to the first surface 241 and the correspondingly oriented second distance 270 to the second surface 305 depicted in FIG. 7, for example.

In an embodiment, the surface 305 is disposed inboard of a surface 307 of the anode 116 and in line with the surface 241 of the anode protector 240. Stated alternatively, the second distance 270 from the center 250 of the MEA to the surface 305 of the cathode 114 is equal to the correspondingly oriented first distance 260. It will be appreciated that in response to a compression of the cell 200 components, the anode protector 240 causes a geometric distortion of at least the anode 116 and the membrane 118. It has been expected that in response to disposition of the surface 305 of the cathode 114 inboard of the surface 307 of the anode 116 and in line with the surface 241 of the anode protector 240, electro-activity of an area 345 of the anode 116 proximate the geometric distortion will be minimal, thereby reducing dendritic growths 315. However, evaluation of tests of embodiments of MEAs 205 configured as depicted in FIG. 7 have found dendritic growths 315, some of which can extend through the membrane 118, to occur in as little as 2000 operating hours. Initial explanation of these dendritic growths 315 considered that manufacturing and assembly tolerances interfered with the desired disposition of the surface 305 of the cathode 114 in line with the correspondingly oriented surface 241 of the anode protector 240, such that the first distance 260 is equal to the correspondingly oriented second distance 270.

Contrary to the above expectations, mathematical modeling software has been found to predict that in response to the surface 305 of the cathode 114 disposed in line with the surface 241 of the anode protector 240 (such that the first distance 260 is equal to the correspondingly oriented second distance 270) an unexpected electrochemical activity, including at least one of a potential field and corresponding current density of an electrolysis reaction, is significant relative to the electrochemical activity that occurs on the anode 116 at position 250, in the area 345 proximate the geometric distortion corresponding to the compression of the cell 200 components, including the anode protector 240.

Referring now to FIGS. 8, 9, and 10, current density predictions based upon cell geometry, as provided by cell modeling software, are depicted. Geometric distortion of the anode 116, resulting from contact with the anode protector 240 is shown in area 345. Current densities of the cathode 114 and anode 116, respectively, are shown by areas 350, 355.

FIG. 8 depicts the cathode 114 disposed such that the second distance 270 is greater than the correspondingly oriented first distance 260, creating an overlap 360 between the surface 305 of the cathode 114 and the surface 241 of the anode protector 240. As expected, it can be seen that the current density 355 proximate the area 345 of geometry distortion is significant. Further, testing of cells 200 having such configurations have confirmed the presence of dendritic growths following the tests.

FIG. 9 depicts the cathode 114 disposed such that second distance 270 is equal to the correspondingly oriented first distance 260, providing the surface 305 of the cathode 114 in line with the surface 241 of the anode protector 240, expected to result in little to no current density within the area 345. However, while the current density 355 proximate the area 345 of geometry distortion is reduced in comparison to FIG. 8, it is still significant, at a value that is greater than 60% of a value of a bulk current density distributed throughout the anode 116, the bulk current density represented by a current density of the anode 116 disposed away from the surface 307, such as indicated by reference numeral 361, for example.

FIG. 10 depicts the cathode 114 disposed such that the first distance 260 is greater than the correspondingly oriented second distance 270, with the surface 305 of the cathode 114 inboard of the surface 241 of the anode protector 240, thereby providing an offset 325 (also herein referred to as a gap). It can be seen that the current density 355 within the anode 116 proximate the area 345 of geometry distortion via the anode protector 240 is less than a comparable current density 355 in the absence of the offset 325 (as depicted in FIG. 9). In fact, the current density proximate the area 345 (as depicted in FIG. 10) is virtually eliminated.

Table 1 depicts results of modeling of different values of offset 325 between the surface 305 of the cathode 114 and the surface 241 of the anode protector 240 for a cell 200 of a specific configuration. Current density 355 of the anode 116 at the start of the anode 116 distortion (as caused by the surface 241 of the anode protector 240) as a percentage of the bulk current density of the anode 116 is shown in the third column.

TABLE 1

| Design Number | Offset 325 (inches) | % Current Density at Area 345 |
| --- | --- | --- |
| 1 | 0 | 62.3% |
| 2 | 0.050 | 2.5% |
| 3 | 0.070 | 0.810% |
| 4 | 0.115 | NA |

Discovery of the significant current density at the start of anode 114 distortion of Design Number 1 (which corresponds to an embodiment as modeled in FIG. 9 having the first distance 260 equal to the correspondingly oriented second distance 270 such that the surface 305 of the cathode 116 is disposed in line with the surface 241 of the anode protector 240) was an unexpected discovery. As previously stated, it has been expected that such an embodiment would provide insignificant anode 116 current density outboard of the cathode 114 edge 305.

An increase of the offset 325 represents a reduction of a total area of the cathode 114. A reduction of the total area of the cathode 114 results in a higher operating voltage of the cell 200, and thereby a reduced overall cell 200 efficiency. Therefore, increasing the offset 325, (while decreasing the total area of the cathode 114) represents an unexpected benefit to reduce the current density at the start of the anode 116 distortion and the occurrence of dendritic growths 315. It will be appreciated that selection of an appropriate offset 325 includes a balance between reduced current density at the start of the anode 116 distortion, and cell 200 operating voltage and efficiency. A combination of modeling and testing have found that design number 2, including the offset 325 having a value of 0.050 inches represents an exemplary balance between reducing current density at the start of the anode 116 distortion (to reduce dendritic growths 315), with the least detriment to efficiency of the cell 200 having the specific configuration corresponding to the data in Table-1. It will be appreciated that results of Table 1 are relate to the specific configuration, which can be effected by variables such as: membrane 118 thickness; membrane 118 conductivity; efficiency of the catalyst (kinetic efficiency); and total current input to the cell 200, for example.

Figure 11:
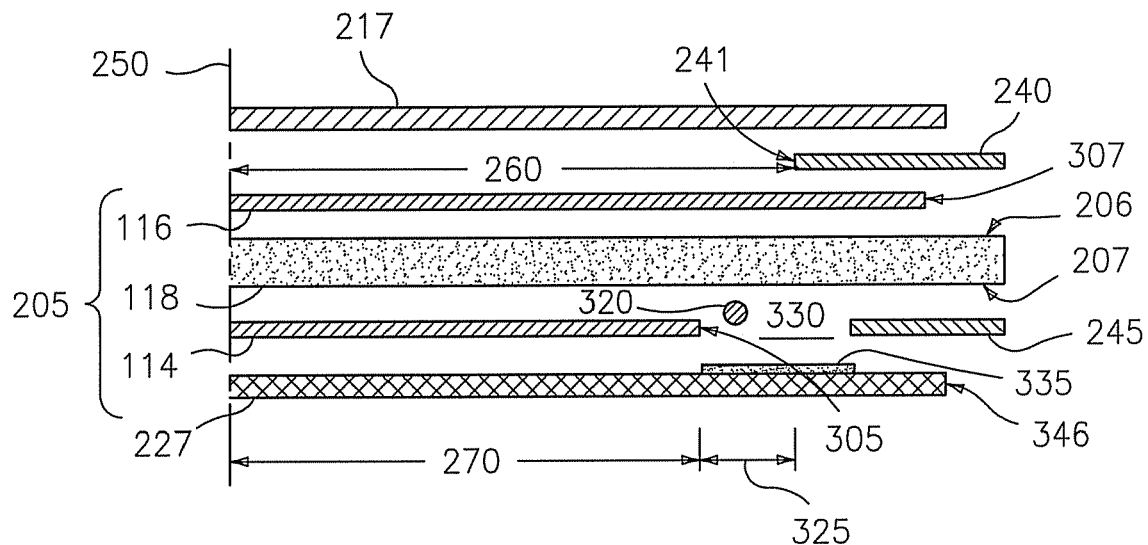
FIGS. 11, 12, and 13 depict exploded partial cross-section schematic diagrams, with some details removed for clarity, of electrochemical cells in accordance with embodiments of the invention.

FIG. 11 depicts an exploded cross section view, with some details removed for clarity, of an embodiment of the cell 200 adapted for reducing current density within the anode 116 near the anode protector 240 at the start of the anode distortion area 345. The surface 305 of the cathode 114 is disposed between the center 250 of the MEA 205 and the surface 241. Accordingly, that the first distance 260 from the center 250 of the MEA 205 to the surface 241 is greater than the correspondingly oriented second distance 270 from the center 250 to the surface 305, thereby defining the offset 325 between the surface 241 and the surface 305. In an embodiment, the offset 325 is 0.050 inches. Tests of the embodiment depicted in FIG. 11, following greater than 2000 operating hours, have been found to be free of dendritic growths 315 that result from at least one of increased potential field and current density proximate the geometric distortion resulting from the anode protector 240.

Use of the flow field member 227 that is catalytically active (such as including platinum plating, for example) is contemplated to further allow electrolysis in unwanted regions (such as the area 345 of geometric distortion, best seen with reference to FIG. 9) of the cell 200. A first portion of the flow field member 227, such as adjacent to the cathode 114 for example, is partially defined by a boundary that is at a distance less than or equal to the correspondingly oriented second distance 270 from the center 250 of the MEA 205. A second portion of the flow field member 227 (such as within an area 330) is defined as between the first portion and an outer edge 346 of the flow field member 227. In an embodiment, at least a portion of the first portion of the flow field member 227 includes a catalytic treatment, and at least a portion of the second portion of the flow field member 227 is configured to be catalytically inactive, or absent the catalytic treatment. For example, the flow field member 227 is absent platinum plating in the area 330. Alternatively, the flow field member 227 may be made of an entirely un-catalyzed material, such as carbon, titanium niobium, zirconium, tantalum, titanium, carbon steel, stainless steel, nickel, cobalt, and alloys thereof, for example that is suitable for use within the cell 200, conductive (to allow for appropriate current collection), and catalytically inactive.

Referring briefly back to FIG. 7, speckles 320 of cathode 114 material, inadvertently disposed at distances greater than the second distance 270, or in the area 330 intended to be electrochemically inactive, may become active if the speckles 320 come into contact with electrically conductive support material, such as the flow field member 227. This can result in a driving force to cause at least one of iridium deposition and dendritic growths 315 from the anode 116 toward the active speckle 320 in response to proper conditions.

Referring back now to FIG. 11, an embodiment includes an electrical insulator 335, such as an electrical insulation layer disposed upon at least a portion of at least one of the second portion of the flow field member 227 in the area 330, and the second side 207 of the membrane 118 at a distance greater than the second distance 270. The electrical insulation layer 335 insulates the flow field member 227 from the membrane 118 and prevents electro-activity of any speckles 320 of cathode 114 material. The insulation layer 335 can be any electrically insulating material that is compatible with the MEA 205, such as Fluorolast coating(s)™ (Commercially available from Laruen Manufacturing, New Philadelphia Ohio), polytetrafluoroethylene, and silicone, for example. The insulation layer 335 may be applied from a solution via at least one of spraying and brushing, and may be in thin sheet form and adhered to at least one of the membrane 118 and the flow field member 227. In an embodiment, a thickness of the insulation layer 335 is greater than about 0.0001 inch and less than about 0.003 inch. As used herein, the term "about" represents a minimum deviation resulting from one or more of material, manufacturing, assembly, and design target tolerances. In an exemplary embodiment, the insulation layer 335 is less than 0.002 inches thick, in order to minimize a distortion of the MEA 205.

Figure 12:
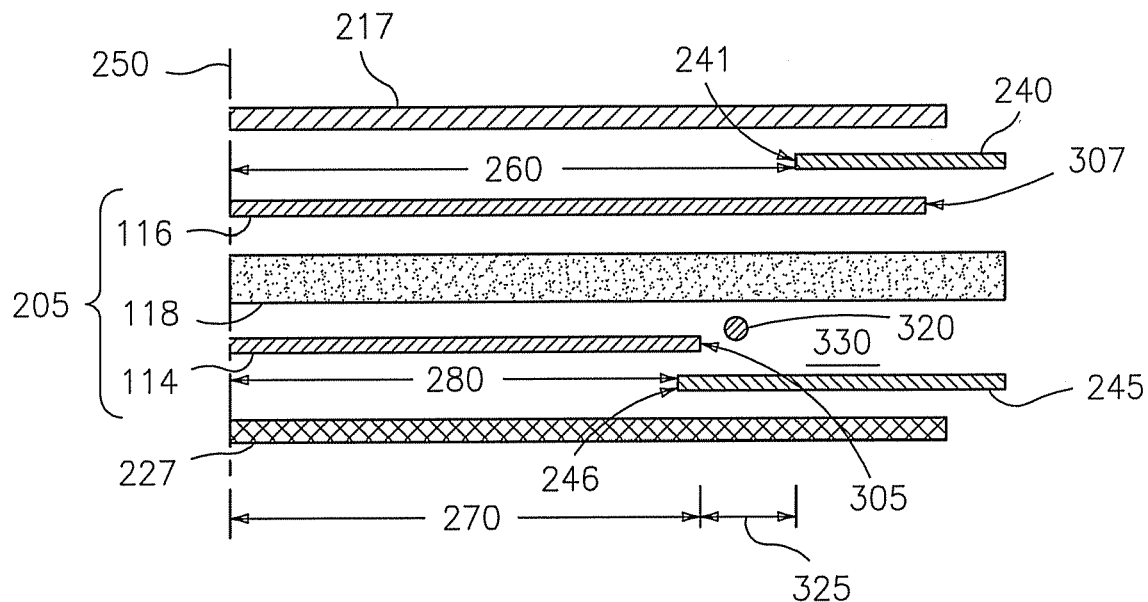

FIG. 12 depicts an embodiment in which the surface 246 (also herein referred to as a protector surface) of the cathode protector 245 has been extended inboard to insulate the second portion of the flow field member 227. Some details have been removed for clarity. The surface 246 is facing toward the center 250 of the MEA 205, and disposed at a protector distance 280 from the center 250. In an embodiment, the protector distance 280 is about equal to the correspondingly oriented second distance 270, and the surface 246 is adjacent, or abuts the surface 305. In another embodiment, the protection distance 280 is less than the correspondingly oriented second distance 270, and the cathode protector 245 will contact the cathode 114. Accordingly, the cathode protector 245 covers the second portion of the flow field member 227 to provide insulation of the flow field member 227 in the area 330 proximate to and outboard of the cathode 114, to eliminate conduction (and resultant electro-activity) between any speckles 320 of cathode material and the flowfield member 227.

Figure 13:
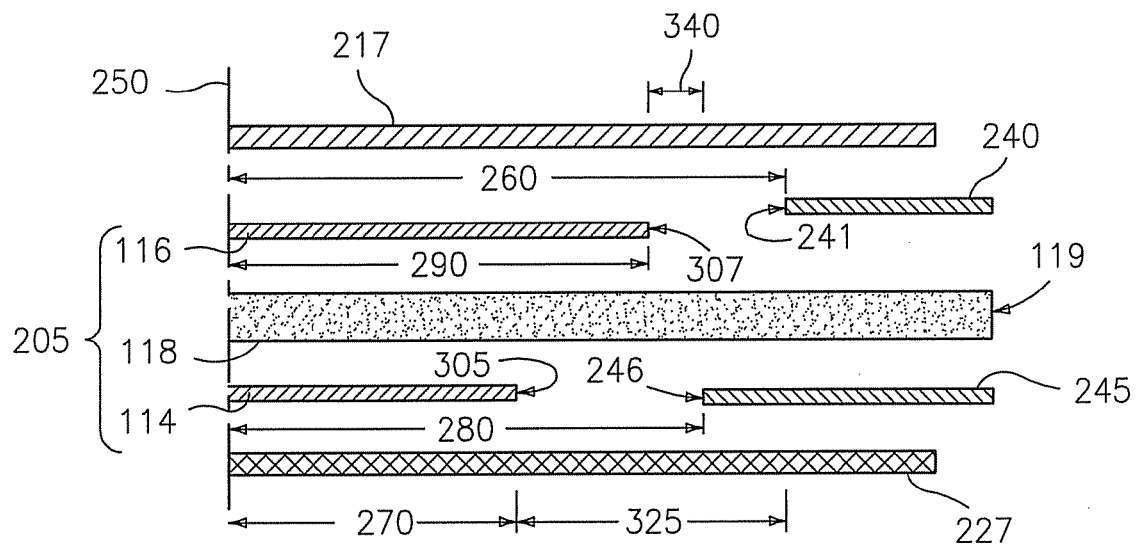

FIG. 13 depicts an embodiment in which the anode 116 has the outer boundary partially defined by the surface 307 (also herein referred to as a third surface) disposed between the center 250 of the MEA 205 and the outer edge 119 of the membrane 118. Some details have been removed for clarity. A third distance 290 from the center 250 of the MEA 205 to the surface 307 is less than the correspondingly oriented protector distance 280, such that the surface 307 of the anode 116 is disposed inboard of the cathode protector 245 to provide an offset 340. The offset 325 provided by the cathode 114 disposed inboard of the anode protector 240 is also included. In an embodiment, the first distance 260 is greater than the correspondingly oriented third distance 290 such that the surface 307 of the anode 116 is inboard of the anode protector 240, thereby eliminating the geometric distortion of the anode 116 and the membrane 118 discussed above and depicted in FIG. 7. Tests of the embodiment described in FIG. 13, following 2000 operating hours, have been found to be free of dendritic growths 315. It will be noted that the second distance 270 from the center 250 of the MEA 205 to the edge 305 of the cathode 114 is less than the correspondingly oriented third distance 290 from the center 250 to the edge 307 of the first electrode 116.

Figure 14:
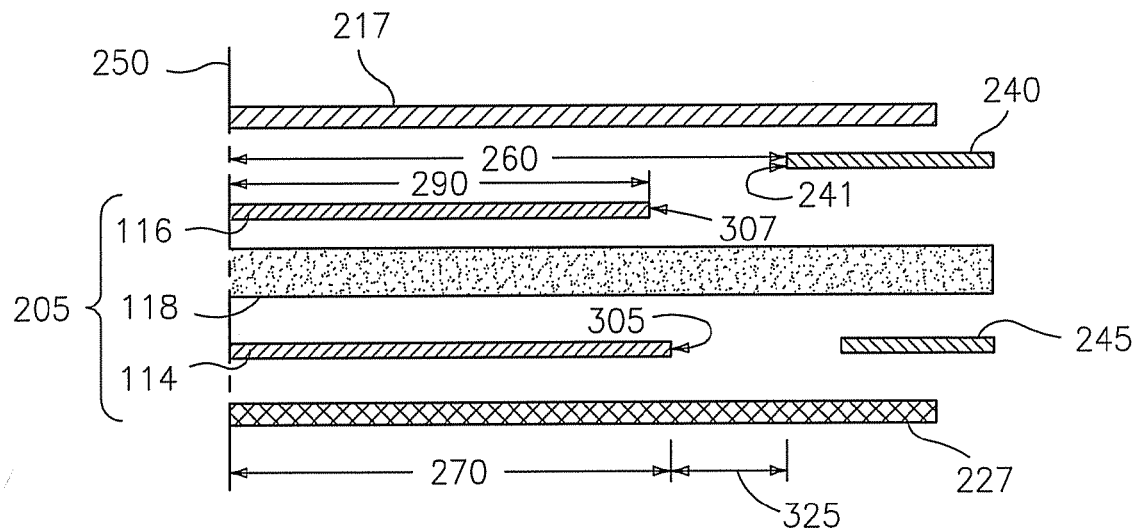
FIG. 14 depicts a schematic diagram, with some details removed for clarity, of an electrochemical cell for testing to confirm benefits provided in accordance with embodiments of the invention.

Referring now to FIG. 14, an alternate embodiment with some details removed for clarity is depicted. The second distance 270 is greater than the correspondingly oriented third distance 290, such that the edge 305 of the cathode 114 is disposed outboard of the edge 307 of the anode 116. This embodiment eliminates the geometric distortion of the anode 116 and the membrane 118 discussed above and provides an evaluation of the effect of disposing the edge 305 of the cathode 114 outboard of the edge 307 of the anode 116. Stated alternatively, this embodiment is configured to compare the contribution of relative displacement between the cathode 114 and the anode 116 with the contribution of the geometric distortion of the anode 116 and membrane 118 described above. Tests of the embodiment described in FIG. 14, following 2000 operating hours, have been found to include dendritic growths 315 originating from the anode 116 toward the cathode 114. Accordingly, tests of this embodiment confirm a beneficial effect of disposal of the edge 307 of the anode 116 outboard of the edge 241 of the cathode 114, as in FIGS. 11 through 13 such that the second distance 270 is less than the correspondingly oriented third distance 290 resulting in a reduced occurrence of dendritic growths from the anode 116 toward the cathode 114 compared with a non-reduced occurrence of dendritic growths from the anode 116 toward the cathode 114 with the second distance 270 equal to, or greater than, the correspondingly oriented third distance 290.

It will be appreciated that in embodiments of the invention, the geometric relationships described above with reference to cross-sections of the cell 200 shall apply to the entire cell, such as along an entire perimeter of the cell, for example, to prevent the formation of dendritic growths.

As disclosed, some embodiments of the invention may include some of the following advantages: the ability to reduce electrochemical activity proximate the anode protector; the ability to reduce dendritic growths resulting from electrochemical activity proximate the anode protector; the ability to render inactive speckles of cathode material; and the ability to reduce dendritic growths resulting from electrochemical activity of speckles of cathode material.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An electrochemical cell apparatus comprising:
a membrane-electrode assembly (MEA) comprising a membrane having a first side and a second side opposite the first side, a first electrode in contact with the first side, and a second electrode in contact with the second side;
a flow field member disposed adjacent to the first electrode opposite the membrane; and
a protector member disposed between the flow field member and the first side of the membrane, the protector member having a boundary partially defined by a first surface facing toward a center of the MEA;
wherein the second electrode has a boundary partially defined by a second surface facing away from the center of the MEA, the second surface disposed between the center of the MEA and the first surface;
wherein a first distance from the center of the MEA to the first surface is greater than a correspondingly oriented second distance from the center of the MEA to the second surface, thereby defining a gap between the first surface and the second surface and causing a current density within the first electrode to be less than a comparable current density in the absence of the gap;
wherein the first electrode has a boundary partially defined by a third surface facing away from the center of the MEA, the third surface disposed between the center of the MEA and an outer edge of the membrane, the third surface disposed at a third distance from the center of the MEA; and
wherein the second distance is less than the correspondingly oriented third distance, resulting in a reduced occurrence of dendritic growths from the first electrode toward the second electrode compared with a non-reduced occurrence of dendritic growths from the first electrode toward the second electrode with the second distance equal to the correspondingly oriented third distance.

2. An electrochemical cell apparatus comprising:
a membrane-electrode assembly (MEA) comprising a membrane having a first side and a second side opposite the first side, a first electrode in contact with the first side, and a second electrode in contact with the second side;
a flow field member disposed adjacent to the first electrode opposite the membrane; and,
a protector member disposed between the flow field member and the first side of the membrane, the protector member having a boundary partially defined by a first surface facing toward a center of the MEA;
wherein the second electrode has a boundary partially defined by a second surface facing away from the center of the MEA, the second surface disposed between the center of the MEA and the first surface;
wherein a first distance from the center of the MEA to the first surface is greater than a correspondingly oriented second distance from the center of the MEA to the second surface, thereby defining a gap between the first surface and the second surface and causing a current density within the first electrode to be less than a comparable current density in the absence of the gap;
wherein the flow field member is a first flow field member, the apparatus further comprising:
a second flow field member disposed adjacent to the second electrode opposite the membrane, the second flow field member having a first portion defined at least in part by a boundary thereof that is at a distance less than or equal to the correspondingly oriented second distance from the center of the MEA, and a second portion defined as being between the first portion and an outer edge of the second flow field member;
an electrical insulator disposed upon at least a portion of at least one of:
the second portion of the second flow field member; and,
the second side of the membrane at a distance greater than the correspondingly oriented second distance;
wherein the protector member is a first protector member, the apparatus further comprising:
a second protector member disposed between the second flow field member and the second side of the membrane, the second protector member having a boundary partially defined by a protector surface facing toward the center of the MEA;
wherein the protector surface is disposed at a protector distance from the center of the MEA;
the second protector member is the electrical insulator; and
the protector distance is about equal to the correspondingly oriented second distance.

3. An electrochemical cell apparatus comprising:
a membrane-electrode assembly (MEA) comprising a membrane having a first side and a second side opposite the first side, a first electrode in contact with the first side, and a second electrode in contact with the second side;
a flow field member disposed adjacent to the first electrode opposite the membrane; and,
a protector member disposed between the flow field member and the first side of the membrane, the protector member having a boundary partially defined by a first surface facing toward a center of the MEA;
wherein the second electrode has a boundary partially defined by a second surface facing away from the center of the MEA, the second surface disposed between the center of the MEA and the first surface;
wherein a first distance from the center of the MEA to the first surface is greater than a correspondingly oriented second distance from the center of the MEA to the second surface, thereby defining a gap between the first surface and the second surface and causing a current density within the first electrode to be less than a comparable current density in the absence of the gap;
wherein the flow field member is a first flow field member, the apparatus further comprising:
a second flow field member disposed adjacent to the second electrode opposite the membrane, the second flow field member having a first portion defined at least in part by a boundary thereof that is at a distance less than or equal to the correspondingly oriented second distance from the center of the MEA, and a second portion defined as being between the first portion and an outer edge of the second flow field member;
an electrical insulator disposed upon at least a portion of at least one of:
the second portion of the second flow field member; and,
the second side of the membrane at a distance greater than the correspondingly oriented second distance;
wherein the protector member is a first protector member, the apparatus further comprising:
a second protector member disposed between the second flow field member and the second side of the membrane, the second protector member having a boundary partially defined by a protector surface facing toward the center of the MEA;
wherein the protector surface is disposed at a protector distance from the center of the MEA;
the second protector member is the electrical insulator; and
the protector distance is less than the correspondingly oriented second distance.

4. An electrochemical cell apparatus comprising:
a membrane-electrode assembly (MEA) comprising a membrane having a first side and a second side opposite the first side, a first electrode in contact with the first side, and a second electrode in contact with the second side;
a flow field member disposed adjacent to the first electrode opposite the membrane; and
a protector member disposed between the flow field member and the first side of the membrane, the protector member having a boundary partially defined by a first surface facing toward a center of the MEA;
wherein the second electrode has a boundary partially defined by a second surface facing away from the center of the MEA, the second surface disposed between the center of the MEA and the first surface;
wherein a first distance from the center of the MEA to the first surface is greater than a correspondingly oriented second distance from the center of the MEA to the second surface, thereby defining a gap between the first surface and the second surface and causing a current density within the first electrode to be less than a comparable current density in the absence of the gap;
wherein the flow field member is a first flow field member, the apparatus further comprising:
a second flow field member disposed adjacent to the second electrode opposite the membrane, the second flow field member having a first portion defined at least in part by a boundary thereof that is at a distance less than or equal to the correspondingly oriented second distance from the center of the MEA, and a second portion defined as being between the first portion and an outer edge of the second flow field member;
an electrical insulator disposed upon at least a portion of at least one of:
the second portion of the second flow field member; and
the second side of the membrane at a distance greater than the correspondingly oriented second distance;
wherein the protector member is a first protector member, the apparatus further comprising:
a second protector member disposed between the second flow field member and the second side of the membrane, the second protector member having a boundary partially defined by a protector surface facing toward the center of the MEA;
wherein the protector surface is disposed at a protector distance from the center of the MEA;
the first electrode has an outer boundary partially defined by a third surface facing away from the center of the MEA, the third surface disposed between the center of the MEA and an outer edge of the membrane;
a third distance from the center of the MEA to the third surface is less than the correspondingly oriented protector distance; and,
the second distance is less than the correspondingly oriented third distance, resulting in a reduced occurrence of dendritic growths from the first electrode toward the second electrode compared with a non-reduced occurrence of dendritic growths from the first electrode toward the second electrode with the second distance equal to or greater than the correspondingly oriented third distance.

* * * * *